(12) United States Patent
Nishio et al.

(10) Patent No.: US 7,432,998 B2
(45) Date of Patent: Oct. 7, 2008

(54) LIQUID CRYSTAL DISPLAY DEVICE

(75) Inventors: Toshiya Nishio, Tottori (JP); Satoshi Noguchi, Tottori (JP)

(73) Assignee: Epson Imaging Devices Corporation, Tokyo (JP)

( * ) Notice: Subject to any disclaimer, the term of this patent is extended or adjusted under 35 U.S.C. 154(b) by 49 days.

(21) Appl. No.: 11/293,282

(22) Filed: Dec. 5, 2005

(65) Prior Publication Data

US 2006/0152664 A1    Jul. 13, 2006

(30) Foreign Application Priority Data

Dec. 9, 2004  (JP) ............................. 2004-356398

(51) Int. Cl.
*G02F 1/1333* (2006.01)
*G02F 1/1345* (2006.01)

(52) U.S. Cl. ......................................... 349/58; 349/150

(58) Field of Classification Search .................. 349/58, 349/150

See application file for complete search history.

(56) References Cited

U.S. PATENT DOCUMENTS

| | | | |
|---|---|---|---|
| 5,657,104 A | 8/1997 | Kanezawa | |
| 6,847,415 B1 * | 1/2005 | Yoshimura et al. | 349/58 |
| 6,979,114 B2 * | 12/2005 | Kao | 362/633 |
| 7,034,913 B2 | 4/2006 | Ishida | |
| 7,095,476 B2 * | 8/2006 | Lo et al. | 349/150 |

FOREIGN PATENT DOCUMENTS

| | | |
|---|---|---|
| CN | 1152721 A | 6/1997 |
| CN | 1532608 A | 9/2004 |
| JP | 9-138388 | 5/1997 |
| JP | 10-39779 | 2/1998 |
| JP | 11-38431 | 2/1999 |

OTHER PUBLICATIONS

Chinese Office Action dated Jun. 29, 2007, issued in corresponding Chinese Patent Application No. 2005101304039.

* cited by examiner

*Primary Examiner*—David Nelms
*Assistant Examiner*—David Y. Chung
(74) *Attorney, Agent, or Firm*—Westerman, Hattori, Daniels & Adrian, LLP.

(57) ABSTRACT

A liquid crystal display device 1 having a liquid crystal display panel 2, a flexible printed circuit board 4, an optical member 7, a case 6 for housing the above-mentioned members, and a front frame 13 for fixing the members housed in the case 6, in which the flexible printed circuit board 4 is folded to form at least two layers and passes through the rear surface of the case 6 via slits 6e', 8e' provided at the bottom of an optical member 7 and the case 6, and attached to the rear surface of the case 6. Further, protrusions 12a, 12b are formed on the rear surface of the case 6, and openings 41, 42 and 41', 42' are formed on the board to fit the protrusions for fixing the flexible printed circuit board 4, and the flexible printed circuit board is fixed to the rear surface of the case 6 by fitting the openings 41, 42 and 41', 42' to the protrusions 12a, 12b. Consequently, it is possible to provide a liquid crystal display device to which a long flexible printed circuit board is mounted in a compact state.

8 Claims, 10 Drawing Sheets

LIQUID CRYSTAL DISPLAY DEVICE

BACKGROUND OF THE INVENTION

1. Field of the Invention

The present invention relates to a liquid crystal display device, more particularly to the method of arranging a flexible printed circuit board connected to a liquid crystal display panel.

2. Description of the Prior Art

A conventional type of a liquid crystal display device of the active matrix type is mainly made up of a liquid crystal display panel where switching devices corresponding to pixel electrodes are arrayed in a matrix state, and a flexible printed circuit board is connected to the switching devices to supply display data, power and the like, and a backlight unit illuminates the liquid crystal display panel.

Such a liquid crystal display device is widely used as the display device for various kinds of equipment such as car navigation devices, laptop personal computers and small-sized television sets, where the size of the liquid crystal display panel varies depending on its application, and the length of the flexible printed circuit board connected to the panel is also variable.

The flexible printed circuit board usually comprises a board of such flexibility where one end thereof connected to the liquid crystal display panel is broader than the other end of the board connected to an interface circuit board.

FIG. 9 is a plane view showing an example of a publicly-known flexible printed circuit board. The flexible printed circuit board 30 is approximately T-shaped where its width tapers from one end 30a toward the other end 30b with the end 30a and the end 30b being connected to the liquid crystal display panel and the interface circuit board, respectively. Specifically, in the flexible printed circuit board, assuming that the width of the T-shaped head portion 30a is "a" and the width of the leg portion 30b is "b", the relationship between a and b is [a>b]. Width a is determined by the size and the number of pixels or the like of the liquid crystal display panel, while width b is determined by the size of the connector mounted on the interface circuit board.

Meanwhile, the high definition and color display qualities of liquid crystal display panels have progressed in recent years, and the number of pixels and electrodes has become larger. Since the number of wirings connected to the electrodes has increased, the width a of the end portion 30a of the flexible printed circuit board connected to the wirings has also become wider.

On the other hand, because the size of the connector mounted on the interface circuit board has become smaller, the width b of the end portion 30b of the flexible printed circuit board has become narrower.

For this reason a large number of wirings, specifically wirings 31a to 31n, are arranged from the T-shaped head portion of the flexible printed circuit board as to converge toward the leg portion thereof. In other words, the large numbers of wirings 31a to 31n are wired such that their width and pitch gradually become narrower as they approach the leg portion.

However, since the wirings wired to the flexible printed circuit board are numerous, a longer wiring path is required to make the width and the pitch of the wirings conform to the tapering T-shaped leg portion 30b.

Since the wiring path usually causes the wirings to converge at the T-shaped head portion which is wider than the T-shaped leg portion, the width "c" of the T-shaped head portion becomes longer in proportion to the thickness of wirings, the number of wirings and the width of leg portion. However, when the T-shaped head portion is lengthened, the flexible printed circuit board itself becomes longer as to require housing-thereof in the device. Various methods have been introduced to solve this problem, one of which is disclosed in Japanese Laid-Open Patent Publication Nos. 9-138388 (FIG. 26, Paragraphs [0071] and [0072]), 10-39779 (FIG. 6, Paragraphs [0021] to [0024]) and 11-38431 (FIG. 3, Paragraphs [0034] and [0035]).

The above-mentioned Japanese Laid-Open Patent Publication Nos. 9-138388 and 10-39779 refer to a liquid crystal display device where the flexible printed circuit board is folded on the rear surface of the liquid crystal display panel and housed between the liquid crystal display panel and the backlight.

Further, FIG. 10 is a cross-sectional view showing a liquid crystal display device described in the above-mentioned Japanese Laid-Open Patent Publication No. 11-38431, where the flexible printed circuit board is folded a number of times like an accordion and housed in the liquid crystal display device.

A liquid crystal display device 20 has a liquid crystal display panel PNL in which a liquid crystal layer is formed between two transparent glass substrates SUB1, SUB2, a light guiding plate 21 that illuminates the display panel, and parts such as a fluorescent tube 22 that leads out light to the light guiding plate, and these parts are housed in a lower shield case LF and fixed by an upper shield case SHD. A flexible printed circuit board FPC is connected to drive IC chips installed on the glass substrate SUB1, folded threefold approximately perpendicular to the display surface of the liquid crystal display panel PNL, and housed in the lower shield case LF.

The flexible printed circuit board of the liquid crystal display device disclosed in Japanese Laid-Open Patent Publication Nos. 9-138388 and 10-39779 is inserted between the liquid crystal display panel and the light guiding plate, while the flexible printed circuit board of liquid crystal display device disclosed in Japanese Laid-Open Patent Publication No. 11-38431 is housed by being folded in the vertical direction therein. Although the flexible printed circuit board can be housed in the device in accordance with these methods when it is relatively short, housing becomes extremely difficult when the board is made longer due to limited housing space in the device.

SUMMARY OF THE INVENTION

The present invention has been created to solve the aforestated problems of prior art, by mounting a flexible printed circuit board that is long and compact upon a liquid crystal display device.

To achieve this objective, Embodiment 1 of the present invention provides for a liquid crystal display device having a liquid crystal display panel, a flexible printed circuit board attached thereto, an optical member that illuminates the liquid crystal display panel, a case for housing all of the aforementioned members, and a front frame for fixing the members housed in the case, whereby the flexible printed circuit board folded to form at least two layers and is made to extend outwardly or lead out to the rear surface of the case via slits provided at the bottom of the optical member and the case, and attached to the rear surface of the case.

Further, Embodiment 2 of the present invention provides for an approximately T-shaped flexible printed circuit board where the width of the board where it is connected to a liquid crystal display panel is greater than its width on the side where it is connected to an interface circuit board.

Further, Embodiment 3 of the present invention provides for a liquid crystal display device according to Embodiment 1, in which protrusions are formed on the rear surface of the case and openings are formed on the flexible printed circuit board, while the flexible printed circuit board is fixed to the rear surface of the case by matching the openings on the flexible printed circuit board to correspond with the protrusions.

Further, Embodiment 4 of the present invention provides for a liquid crystal display device according to Embodiment 3, in which at least two of the protrusions are spaced at a predetermined gap, the openings being provided on positions corresponding to the protrusions, and the area of one such opening is made larger than the area of the other opening.

Furthermore, Embodiment 5 of the present invention refers to a liquid crystal display device according to Embodiment 1 or 3, in which double-faced adhesive tape is attached to a certain area of the flexible printed circuit board, which is made to extend outwardly from the case, and the circuit board is adhered to the rear surface of the case.

BRIEF DESCRIPTION OF THE DRAWINGS

FIG. 3 is intended to illustrate the process of assembling the liquid crystal display device referred to in FIG. 1, in which FIG. 3A is a perspective of the device viewed from the front while

FIG. 4 is intended to illustrate the process of folding and housing the flexible printed circuit board, in which FIG. 4A is a rear view of the circuit board before it is folded while

FIG. 5A is a front view of the assembled liquid crystal display device, while

FIG. 7 shows the liquid crystal display device taken along the VB-VB line drawn in FIG. 5A, in which FIG. 7A is a perspective view of its external appearance while

FIG. 8 is intended to facilitate understanding of the locking state of the front frame and the case, in which FIG. 8A is a perspective view of the external appearance thereof taken along the VIIIA-VIIIA line drawn in FIG. 7A while

DESCRIPTION OF THE PREFERRED EMBODIMENT

The preferred embodiment of the present invention will hereafter be described in relation to the drawings. However, while the embodiment illustrated below exemplifies the technical concept of the present invention for a liquid crystal display device, such is not intended to restrict the applicability of the invention to a liquid crystal display device, as other embodiments included within the scope of the Claims are equally applicable.

Figure 1:
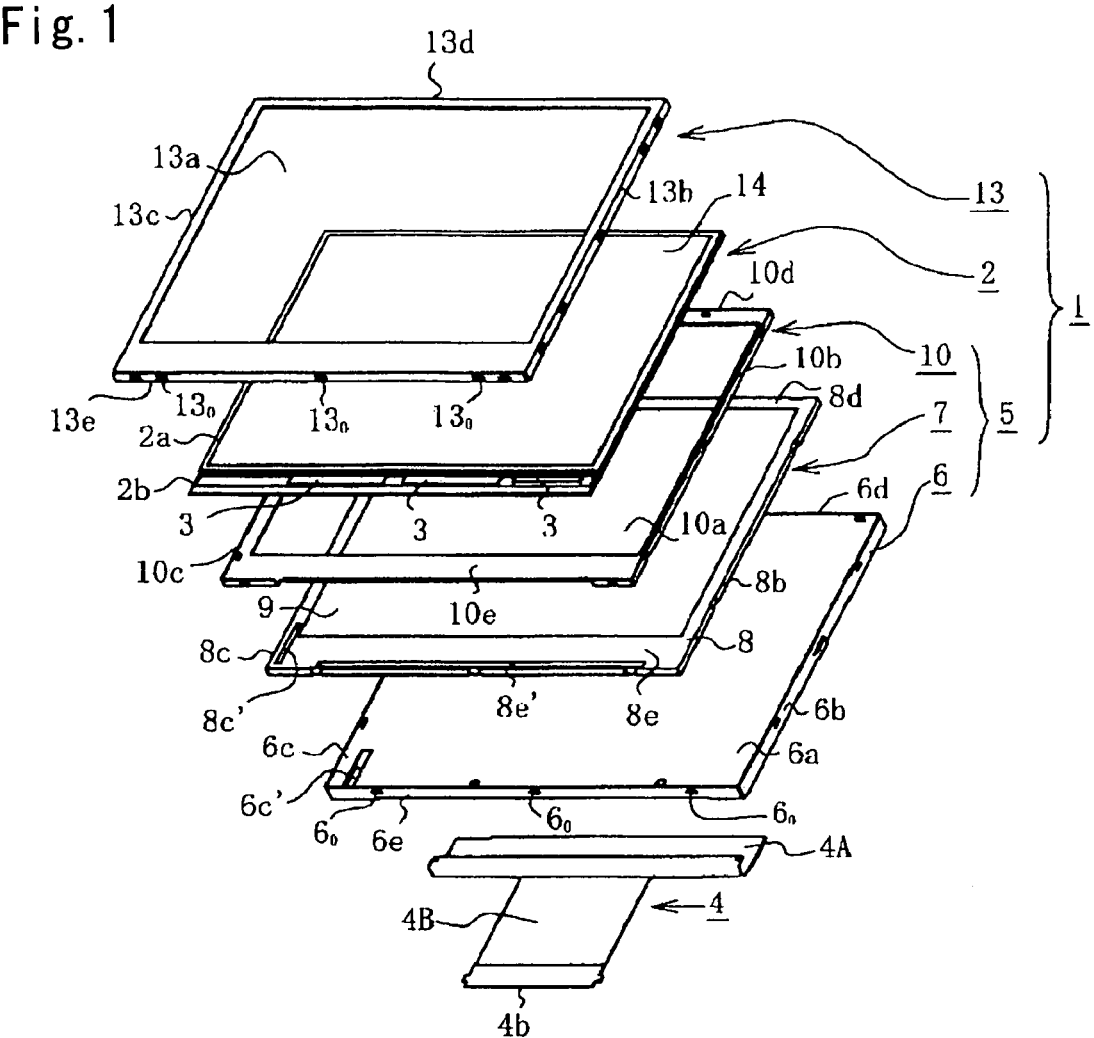
FIG. 1 is an exploded perspective view showing the liquid crystal display device according to an embodiment of the present invention.
Figure 2:
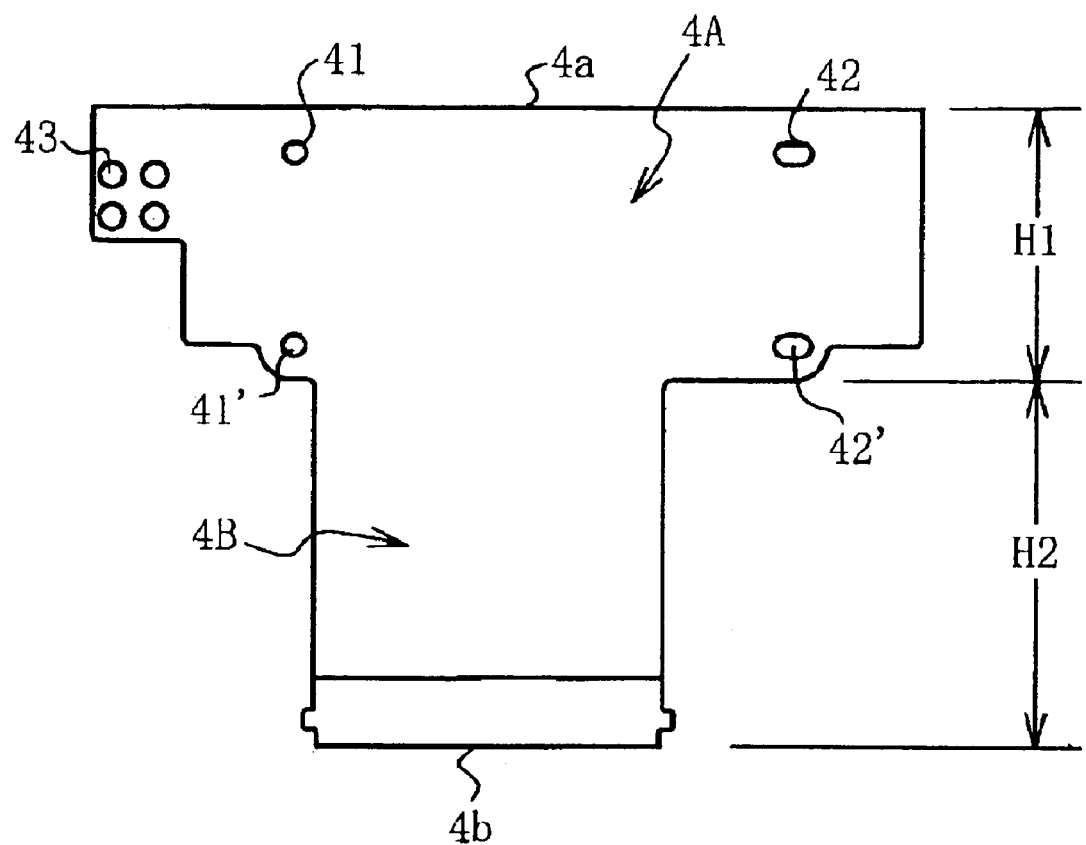
FIG. 2 is a plane view showing a portion of the flexible printed circuit board constituting the liquid crystal display device of FIG. 1.
Figure 3A:
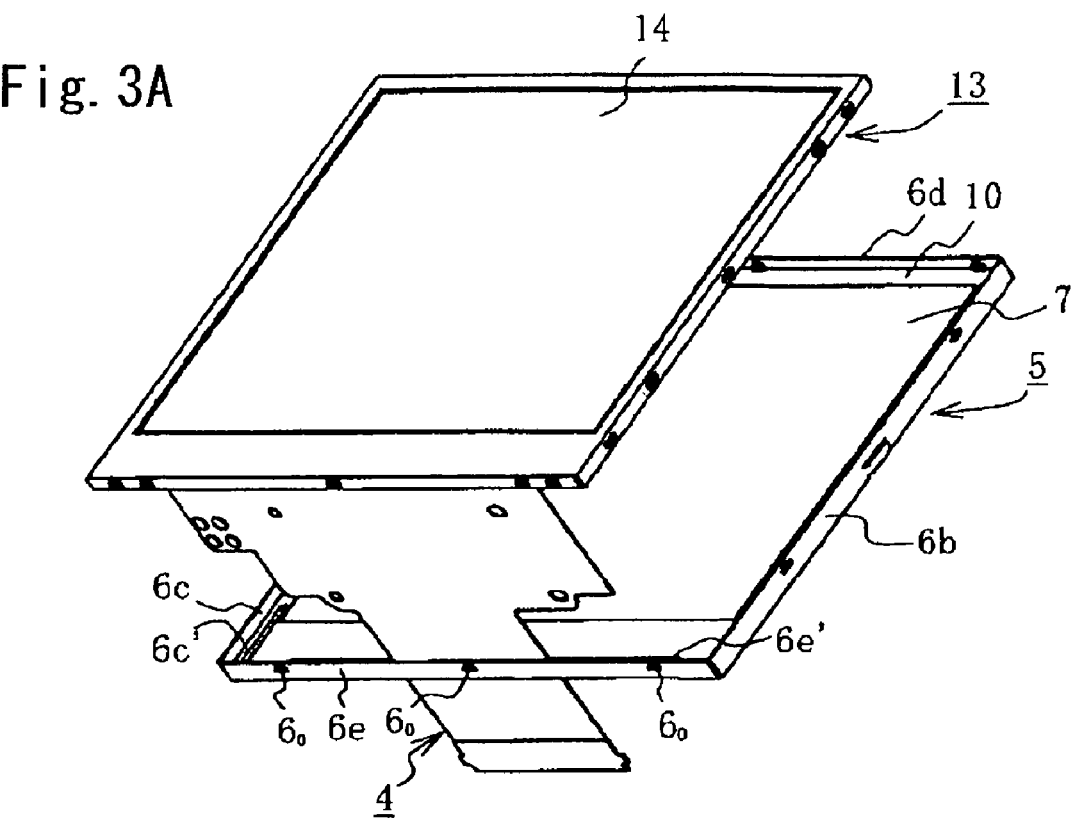
Figure 3B:
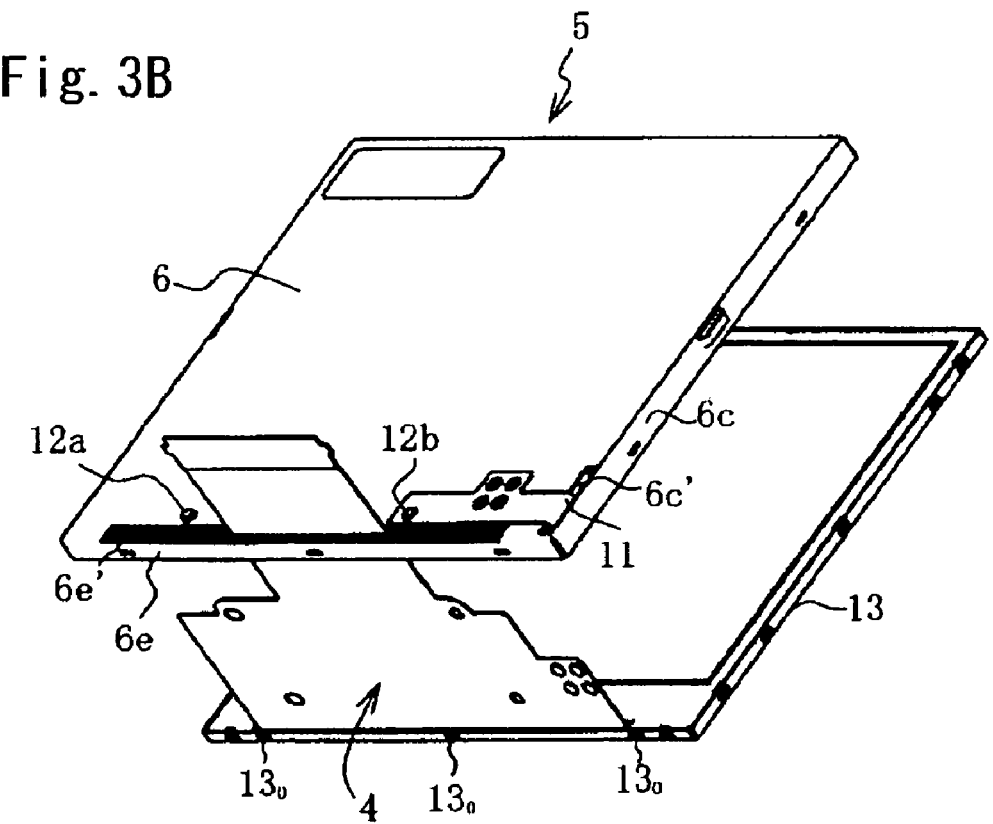
FIG. 3B is a perspective of the device viewed from the back thereof.
Figure 4A:
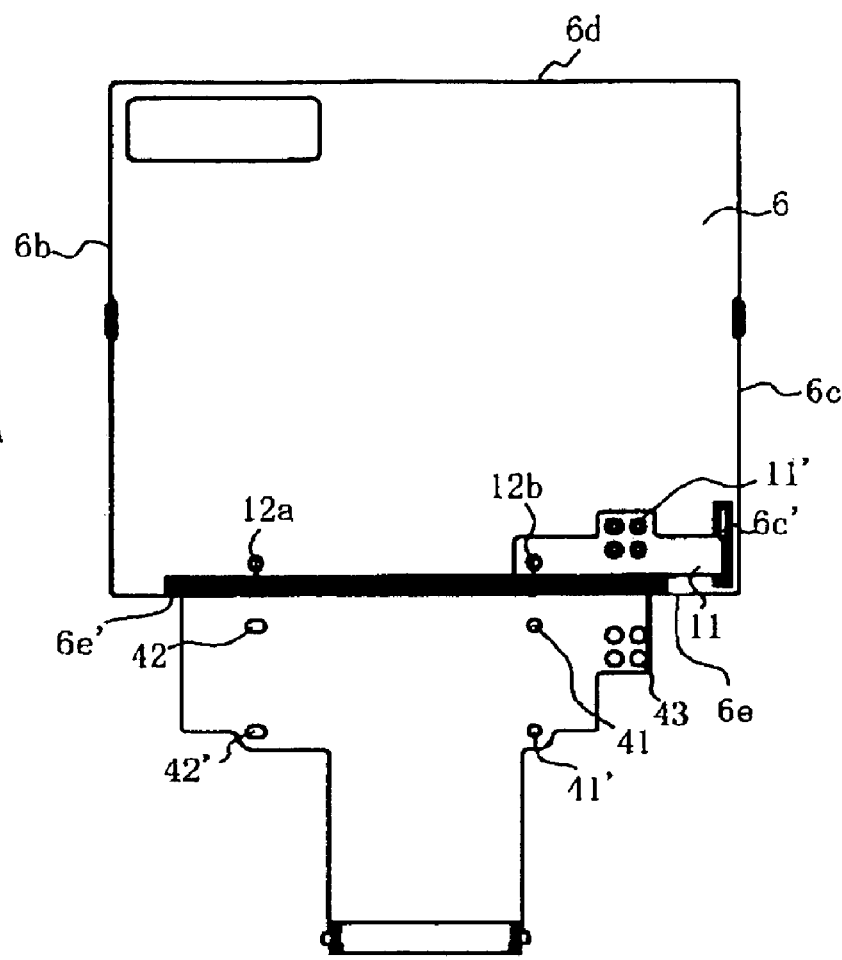
Figure 4B:
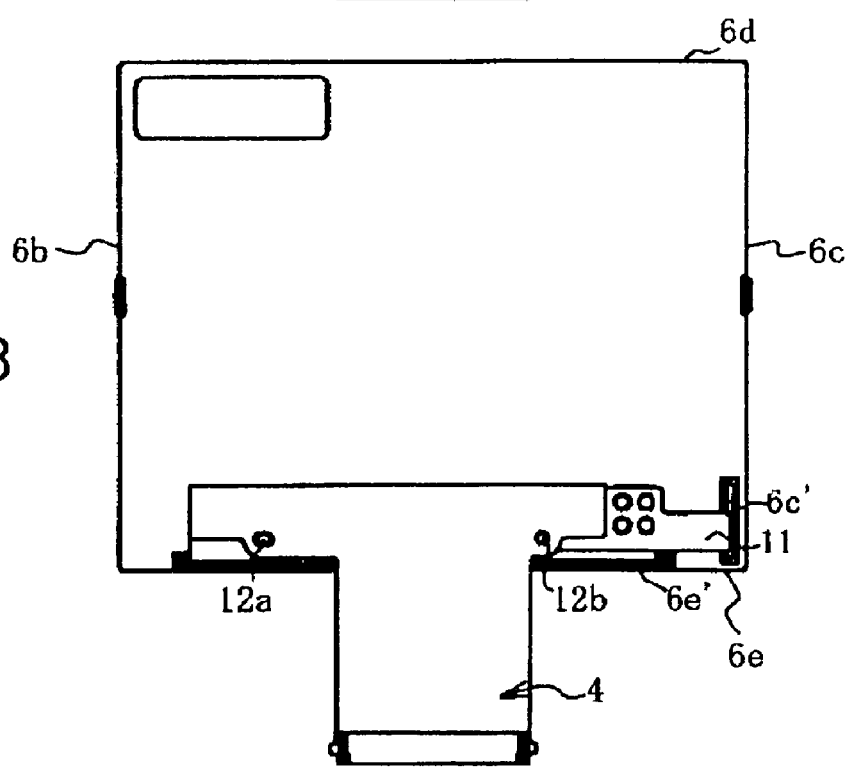
FIG. 4B is a rear view of the circuit board in its folded state.
Figure 5A:
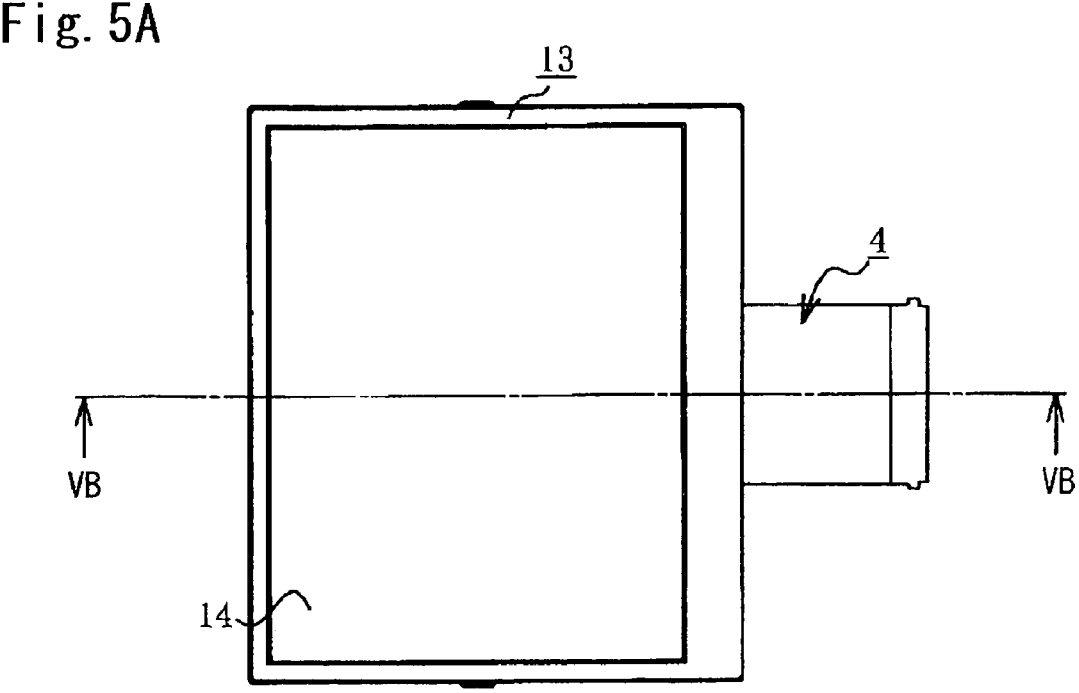
Figure 5B:
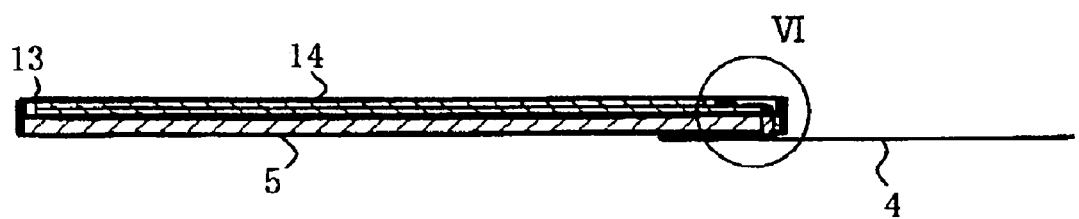
FIG. 5B is a cross-sectional view of the device taken along the VB-VB line drawn in FIG. 5A.
Figure 6:
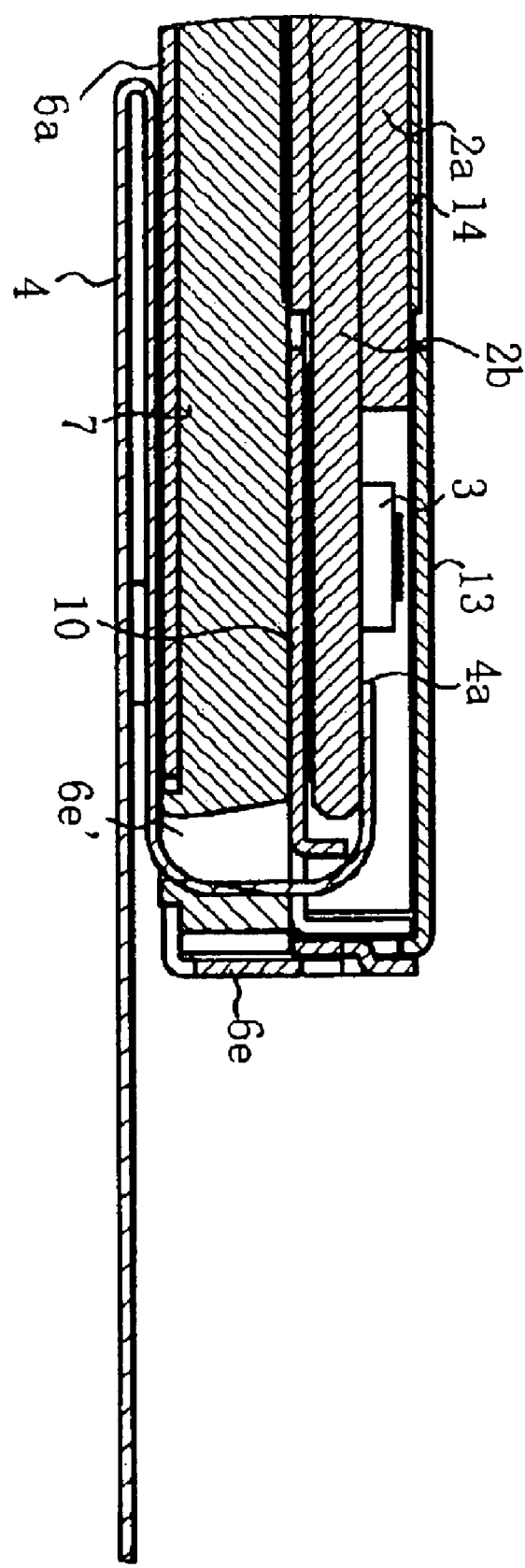
FIG. 6 is an enlarged cross-sectional view of the area marked "VI" in FIG. 5B.
Figure 7A:
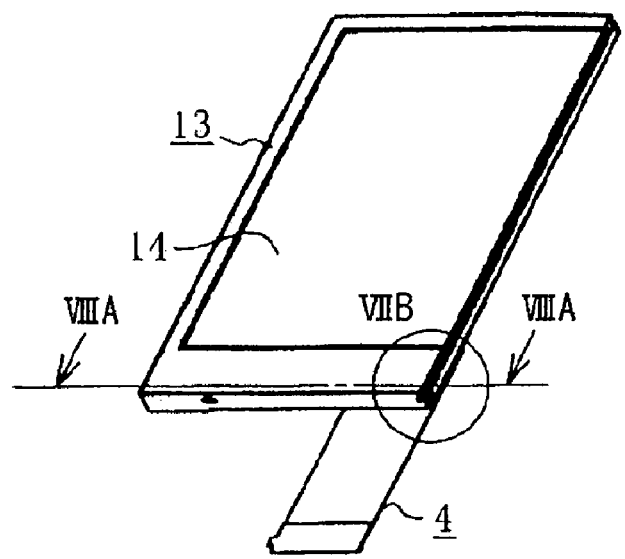
Figure 7B:
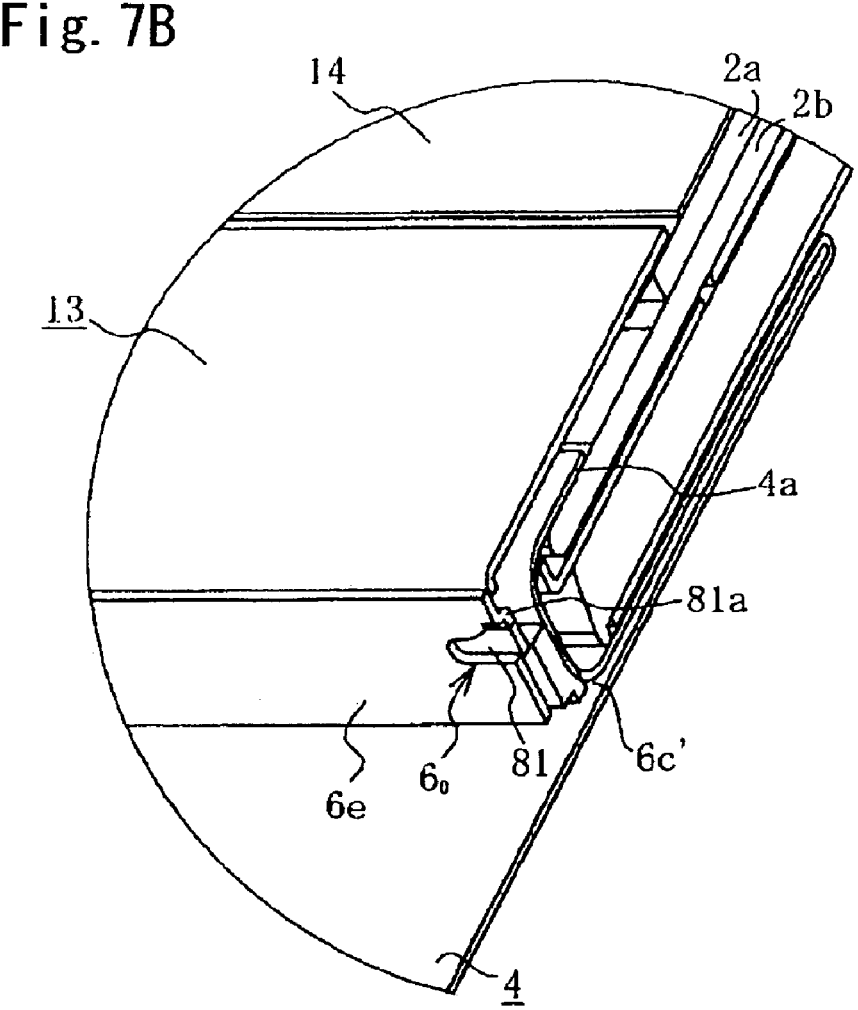
FIG. 7B is an enlarged cross-sectional view of the area marked "VIIB" in FIG. 7A.
Figure 8A:
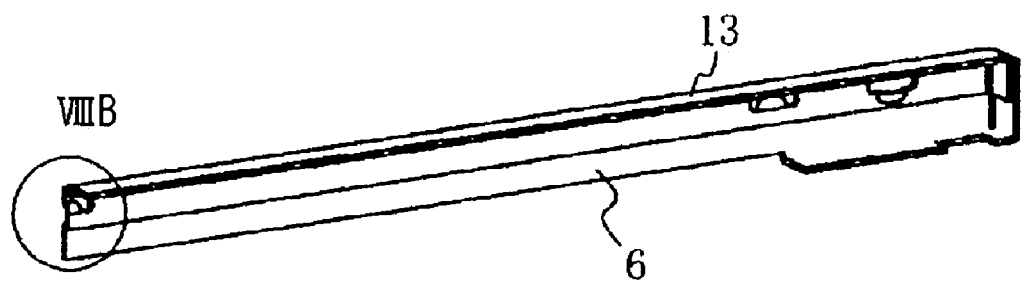
Figure 8B:
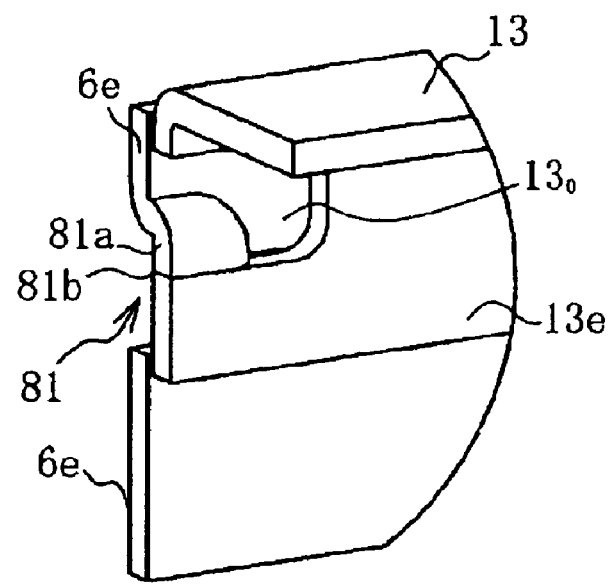
FIG. 8B is an enlarged view of the area marked "VIIIB" in FIG. 8A.
Figure 9:
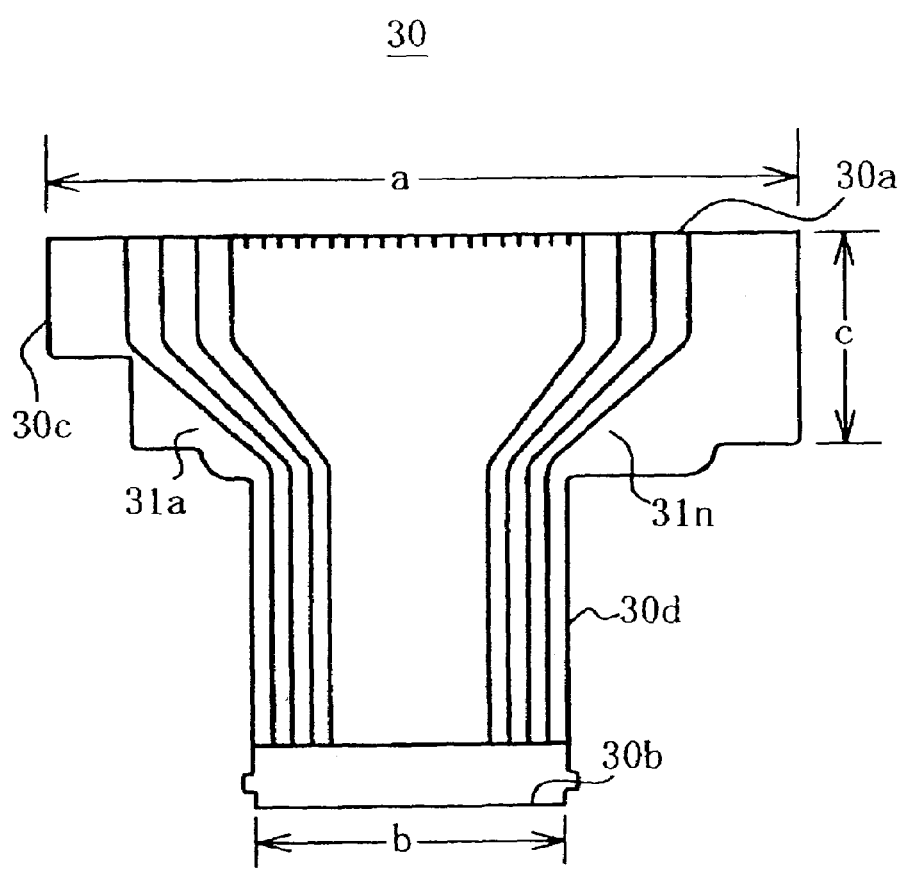
FIG. 9 is the plane view of an example of a publicly-known flexible printed circuit board.
Figure 10:
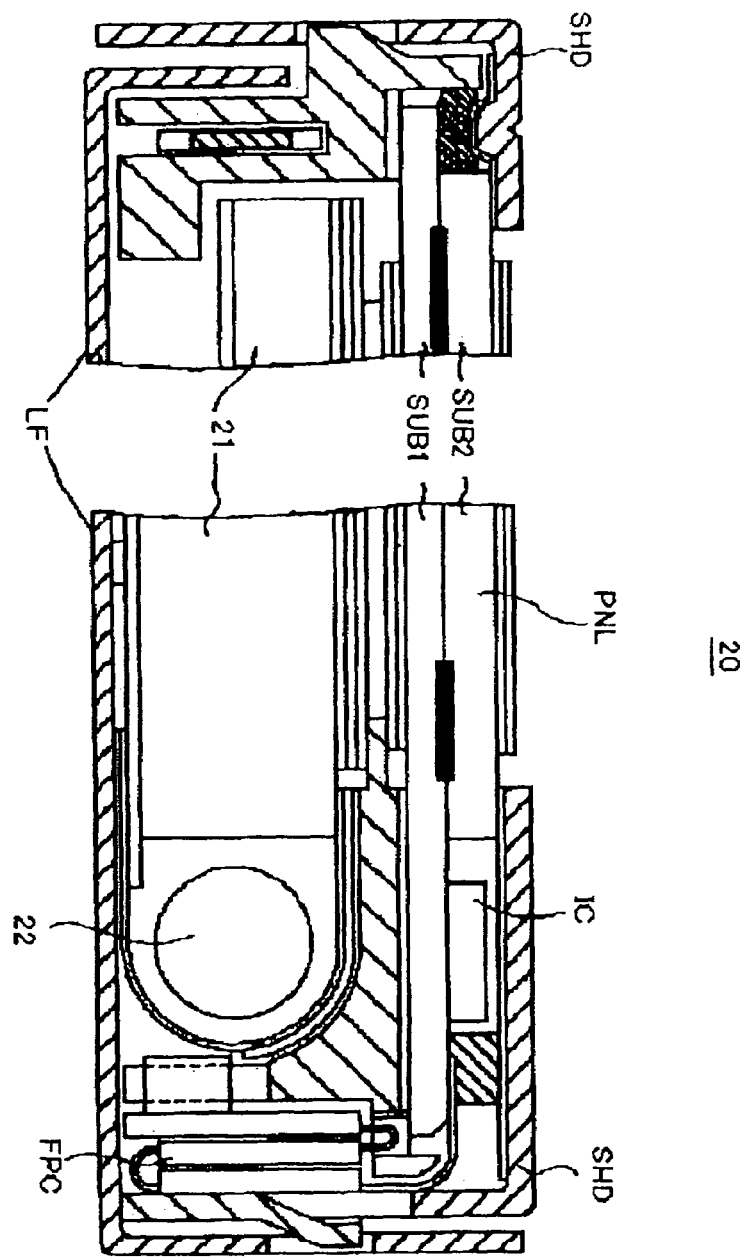
FIG. 10 is a cross-sectional view of a conventional liquid crystal display device.

FIG. 1 is an exploded perspective view showing the liquid crystal display device according to an embodiment of the present invention. FIG. 2 is a plane view showing a portion of the flexible printed circuit board constituting the liquid crystal display device of FIG. 1. FIG. 3 is intended to illustrate the process of assembling the liquid crystal display device referred to in FIG. 1, in which FIG. 3A is a perspective of the device viewed from the front while FIG. 3B is a perspective of the device viewed from the back thereof. FIG. 4 is intended to illustrate the process of folding and housing the flexible printed circuit board, in which FIG. 4A is a rear view of the circuit board before it is folded while FIG. 4B is a rear view of the circuit board in its folded state. FIG. 5a is a front view of the assembled liquid crystal display device, while FIG. 5B is a cross-sectional view of the device taken along the VB-VB line drawn in FIG. 5A. FIG. 6 is an enlarged cross-sectional view of the area marked "VI" in FIG. 5B. FIG. 7 shows the liquid crystal display device taken along the VB-VB line drawn in FIG. 5A, in which FIG. 7A is a perspective view of its external appearance while FIG. 7B is an enlarged cross-sectional view of the area marked "VIIB" in FIG. 7A. FIG. 8 is intended to facilitate understanding of the locking state of the front frame and the case, in which FIG. 8A is a perspective view of the external appearance thereof taken along the VIIIA-VIIIA line drawn in FIG. 7A while FIG. 8B is an enlarged view of the area marked "VIIIB" in FIG. 8A.

As shown in FIG. 1, the liquid crystal display device 1 is made up of a liquid crystal display panel 2, a backlight unit 5 that illuminates the liquid crystal display panel 2, a front frame 13 that integrally fixes the liquid crystal display panel 2 which is covered by the backlight unit 5 while the liquid crystal display panel 2 is mounted on the backlight unit 5.

The liquid crystal display panel 2 comprises a pair of glass substrates 2a, 2b made to lie opposite each other, while a liquid crystal layer (not shown) is laid between the glass substrates 2a, 2b, and stacked together and joined by a sealing member. Further, a plurality of IC chips 3 for driving liquid crystal are installed at one side edge of the lower glass substrate 2b, and IC chips 3 are connected to the electrodes of the liquid crystal display panel 2, while the other edge thereof is connected to a flexible printed circuit board 4 (described later). Furthermore, a polarizing plate 14 is installed on the glass substrate 2a.

In the flexible printed circuit board 4, as shown in FIG. 2, one end 4a is connected to the liquid crystal display panel 2 while the other end 4b is connected to an interface circuit board (not shown) for supplying power or the like to drive the liquid crystal display panel, and the board has a flexible thin film plate-like T-shaped body which tapers from the end 4a toward the end 4b. Further, the T-shaped head portion 4A has a relatively long vertical width H1 while the T-shaped leg portion 4B has a predetermined length H2 sufficient to allow connection to the interface circuit board.

Furthermore, two small holes 41, 42, and 41', 42' are severally formed at positions close to the upper and lower ends of the T-shaped head portion 4A. The small holes 41, 41' are circular in shape while the small holes 42, 42' are elliptical. Further, four holes 43 are provided at positions close to the small hole 41, the holes 43 being attached to a connector 11' of lead wire 11 that is led out from a light source in the backlight unit 5, and the holes electrically connect the lead wire 11 and the flexible printed circuit board 4 thereby allowing power supplied to the flexible printed circuit board 4 to be supplied to the lead wire 11 as well.

The backlight unit 5 is made up of a case 6, an optical member 7 housed in the case 6, and a support frame 10 that supports the liquid crystal display panel 2, as shown in FIG. 1.

The case 6 which is formed by sheet metal processing is box-shaped and whose upper portion is open, and has a rectangular bottom wall portion 6a and low sidewall portions 6b to 6e that are bent from the outer peripheral edge of the bottom wall portion 6a.

On the bottom wall portion 6a, a relatively long slit 6e' is formed at a position close to the sidewall portion 6e to lie parallel with the sidewall portion 6e, while a relatively short slit 6c' is formed at a position close to the sidewall portion 6c to lie parallel with the sidewall portion 6c, and also at a position close to the sidewall portion 6d, as shown in FIG. 3B. The groove width and the length of the slit 6e' is such as to allow the T-shaped head portion 4A of the flexible printed circuit board to be inserted, and the size of the slit 6c' is such as to allow the lead wire 11 for supplying power to a light source (described later) to be inserted. In addition, two columnar protrusions 12a, 12b are formed on the rear surface of the bottom wall portion 6a with a predetermined gap at positions close to the slit 6e', as shown in FIG. 3B.

Furthermore, a plurality of locking portions $6_0$ is formed on the surface of the sidewall portion 6e as shown in FIGS. 1 and 7B. The locking portion $6_0$ consists of an elongated opening 81 and a locking nail 81a whereby the central portion of the upper periphery of the opening 81 is approximately concave in shape. A portion of the upper periphery of the locking nail 81a is bent inward to form a step while a tip 81b has a flat surface as shown in FIG. 8B.

Still further, the front frame 13 has sides 13b to 13e drooping downward from its peripheral end, while an elongated opening $13_0$ engaged with the locking nail 81a is formed on one side 13e of these sides.

The external shape of the optical member 7 is such as to allow it to fit into the upper opening of the box-shaped case 6 as shown in FIG. 1, and consists of a reflection case 8, which has a housing portion large enough to house a light guiding plate and an inner optical sheet and whose upper portion is open, a light guiding plate (not shown) that illuminates the liquid crystal display panel 2, an optical sheet 9 mounted on the light guiding plate, and a light source (not shown) that is arranged near one side edge of the reflection case 8 and leads out light to the light guiding plate.

The reflection case 8 is box-shaped having a bottom, and whose upper portion is open and is surrounded by low sidewall portions. The inner wall of the reflection case 8 is a reflection surface. In addition, one side 8e out of a plurality of peripheral sides 8b to 8e is formed wide, and a slit 8e' large enough to insert the flexible printed circuit board 4 is formed on the wider side along the sidewall portion. Further, a plurality of LEDs (not shown) is installed on another side 8c as light sources, and a slit 8c' is also formed on the side 8c for inserting the lead wire 11, which supplies power to the light sources therein.

The optical sheet 9 is made up of a plurality of sheets such as a lens sheet, a diffusion sheet and a prism sheet, for example, and they are stacked and disposed on the light guiding plate. Further, a support frame 10 is made up of a picture frame-shaped frame body having an external shape that fits into the upper opening of the reflection case 8 as shown in FIG. 1, its periphery being surrounded by four frame sides 10b to 10e, and has an opening 10a large enough to expose the light guiding plate 9 from the inside.

The front frame 13 is made up of a picture frame-shaped frame body, which is large enough to be fitted into the upper opening of the box-shaped case 6 as shown in FIG. 1, its periphery being surrounded by four frame sides 13b to 13e drooping downward from its peripheral edge, and has an opening 13a large enough to expose the display surface of the liquid crystal display panel 2 from the inside. Further, a plurality of locking holes $13_0$ are formed on the sidewall of the one frame side 13e out of the four frame sides 13b to 13e. The locking holes $13_0$ have elongated openings, and the lower edges of the locking holes $13_0$ are engaged with the tips 81b of the locking nails 81a of the locking portions $6_0$ (refer to FIGS. 7 and 8).

The process of assembling the liquid crystal display device will hereafter be described with reference to FIG. 1 to FIG. 6.

First, the flexible printed circuit board 4 is installed to the IC chips 3 that are provided at one side edge of one glass substrate 2b of the liquid crystal display panel 2. Then, the liquid crystal display panel 2, in which the flexible printed circuit board 4 is connected to the backlight unit 5 comprising the case 6, the optical member 7 and the support frame 10, is mounted on the glass substrates, and they are fixed to the case 6 by the front frame 13 so as to cover the periphery of the liquid crystal display panel 2. The fixing action is performed by engaging the locking portions $6_0$ of the case 6 with the locking holes $13_0$ of the front frame 13. Specifically, when the side 13e of the front frame 13 is pushed down while it is allowed to contact the inside of the sidewall portion 6e of the case 6, the sidewall positioned below the locking holes $13_0$ of the side 13e is pushed down while it is brought into contact with the locking nails 81a, and the bottom edges of the locking holes $13_0$ are locked to the tips 81b of the locking nails 81a.

Furthermore, to install it to the liquid crystal display panel 2, the flexible printed circuit board 4 is inserted into the slits 8e', 6e' that are respectively provided on the reflection case 8 and the case 6 when it is mounted on the backlight unit 5 (refer to FIGS. 3A and 3B), and the circuit board is led out to the rear surface of the case 6 (refer to FIG. 4A).

Regarding the flexible printed circuit board 4 led out from the slit 6e', the protrusions 12a, 12b on the rear surface of the case 6 are engaged with the small holes 41, 42 of the flexible printed circuit board 4, as shown in FIG. 4B. At this point, the protrusion 12a can easily fit the small hole 42 even if the position of the small hole 42 is slightly misaligned from the protrusion since it is elliptical in shape.

After the protrusions 12a, 12b on the rear surface of the case 6 are engaged with the small holes 41, 42 of the flexible printed circuit board 4, the circuit board is folded back halfway to allow the protrusions 12a, 12b to become engaged also with the other small holes 41', 42', and then, the end portion 4b of the flexible printed circuit board 4 is led out to the outside of the case 6 (FIG. 4B, FIG. 5). To maintain such folded state, it is preferable to attach double-faced adhesive tape (not shown) on the flexible printed circuit board 4 to fix the board on the rear surface of the case 6.

Even if the liquid crystal display panel 2 requires a large number of wirings and the width c (refer to Fig.)) of the T-shaped head portion 4A of the flexible printed circuit board is long in order to connect the wirings to the small connector installed on the external interface circuit board, the long flexible printed circuit board 4 can be easily attached on the rear surface of the case 6 of the backlight unit 5 because it acquires a compact form when folded as described above. Specifically, the long flexible printed circuit board 4 can be disposed without the need to provide special housing space therefor in the liquid crystal display device 1. Furthermore, with this structure, it is possible to even lengthen the T-shaped head portion 4A of the flexible printed circuit board 4 by modifying its folding position or the like.

Still further, even if tensile force is applied to the flexible printed circuit board 4 from the outside, such external force will not influence or affect the connection portion 4b of the liquid crystal display panel 2 because the flexible printed circuit board 4 is attached on the rear surface of the case 6 of the backlight unit 5 by means of the protrusions 12a, 12b, and connection failure or the like caused by disconnection from the IC chips 3 can be avoided.

Under the above-described constitution, the present invention produces the following effects. Specifically, according to the invention of Embodiment 1, even if the length of the T-shaped head portion for binding the wirings of the T-shaped flexible printed circuit board becomes relatively long in order to connect the flexible printed circuit board to a small connector of the interface circuit board brought about by the increase in size of the liquid crystal display panel and the increased number of wirings associated with higher definition, the long flexible printed circuit board can be folded as to make it compact and therefore easy to attach on the rear surface of the case. In short, the flexible printed circuit board can be constituted with a long T-shaped head portion without requiring special housing space in the device.

Further, even if tensile force is applied to the flexible printed circuit board from the outside, such external force will not influence or affect the portion where the flexible printed circuit board and the liquid crystal display panel are connected because the flexible printed circuit board is attached on the rear surface of the case of the backlight unit, and therefore, accidents such as connection failures due to disconnection from the fixed connection portion can be avoided.

According to the invention of Embodiment 2, the flexible printed circuit board is approximately T-shaped where the width of the board where it is connected to the liquid crystal display panel is greater than its width on the side where it is connected to the interface circuit board, so that even if the T shaped head portion at the connection side to the liquid crystal display panel is lengthened, the long flexible printed circuit board on the side where it is connected to the interface circuit board can be easily attached by folding compactly on the rear surface of the case of the backlight unit.

According to the invention of Embodiment 3, the openings are provided on the flexible printed circuit board and the openings are fitted to the protrusions on the rear surface of the case to lock the board, so that even if external force is applied to the flexible printed circuit board, such force will not influence or affect the portion where the flexible printed circuit board and the liquid crystal display panel are connected, and thus contact failure or the like can be prevented.

According to the invention of Embodiment 4, by making the area of one of the two openings formed on the flexible printed circuit board larger than that of the other, fitting can be easily performed even if the protrusions are slightly misaligned.

According to the invention of Embodiment 5, the long flexible printed circuit board can be easily attached on the rear surface of the case by using double-faced adhesive tape.

What is claimed is:

1. A liquid crystal display device comprising:
   a liquid crystal display panel;
   a flexible printed circuit board attached to the liquid crystal display panel;
   an optical member that illuminates the liquid crystal display panel;
   a case for housing the liquid crystal display panel and the optical member; and
   a front frame for fixing the members housed in the case,
   wherein the flexible printed circuit board is attached to the rear surface of the case in form of being folded in at least two layers after passing through the rear surface of the case via slits provided at the bottom of the optical member and the case, and an end portion of the flexible print circuit board is led out to outside of the case.

2. The liquid crystal display device according to claim 1, wherein the flexible printed circuit board is approximately T-shaped where the width of the region of the board connected to the liquid crystal display panel is greater than the width of the region of the board connected to an interface circuit board.

3. The liquid crystal display device according to claim 1, wherein protrusions are formed on the rear surface of the case and openings are formed on the flexible printed circuit board which in turn is fixed to the rear surface of the ease, by fitting the openings of the circuit board to the protrusions.

4. The liquid crystal display device according to claim 3, wherein at least two of the protrusions are provided at a predetermined gap, the openings being provided on positions corresponding to the protrusions, and the area of one such opening is made larger than the area of the other opening.

5. The liquid crystal display device according to claim 1, wherein double-faced adhesive tape is attached to a certain area of the flexible printed circuit board, which is led out from the case, and the board is adhered to the rear surface of the case.

6. The liquid crystal display device according to claim 3, wherein double-faced adhesive tape is attached to a certain area of the flexible printed circuit board, which is led out from the case, and the board is adhered to the rear surface of the case.

7. The liquid crystal display device according to claim 1, wherein the flexible printed circuit board is folded twice to form the at least two layers.

8. The liquid crystal display device according to claim 1, wherein the at least two layers are attached to the rear surface of the case.

* * * * *